Dec. 17, 1963 C. D. GRABER ETAL 3,114,499

AFTER-HOUR DEPOSITORY

Filed May 29, 1962 7 Sheets-Sheet 1

INVENTORS
Carl D. Graber and
Leo J. Grosswiller, Jr.
BY Frease, Bishop, Johns & Schick
ATTORNEYS INVENTORS
Carl D. Graber and
Leo J. Grosswiller, Jr.
BY Frease, Bishop, Johns & Schick
ATTORNEYS INVENTORS
Carl D. Graber and
Leo J. Grosswiller, Jr.
BY Frease, Bishop, Johns & Schick
ATTORNEYS INVENTORS
Carl D. Graber and
Leo J. Grosswiller, Jr.
BY Frease, Bishop, Johns & Schick
ATTORNEYS

AFTER-HOUR DEPOSITORY

Filed May 29, 1962

7 Sheets-Sheet 5

INVENTORS
Carl D. Graber and
BY Leo J. Grosswiller, Jr.
Frease, Bishop, Johns & Schick
ATTORNEYS

AFTER-HOUR DEPOSITORY

Filed May 29, 1962

INVENTORS
Carl D. Graber and
Leo J. Grosswiller, Jr.
BY
Frease, Bishop, Johns & Schick
ATTORNEYS INVENTORS
Carl D. Graber and
Leo J. Grosswiller, Jr.
BY
Frease, Bishop, Johns & Schick
ATTORNEYS United States Patent Office 3,114,499
Patented Dec. 17, 1963

3,114,499
AFTER-HOUR DEPOSITORY

Carl D. Graber, Orrville, and Leo J. Grosswiller, Jr., Louisville, Ohio, assignors to Diebold, Incorporated, Canton, Ohio, a corporation of Ohio Filed May 29, 1962, Ser. No. 198,493
9 Claims. (Cl. 232—44)

The invention relates to after-hour depositories used by banks and similar business institutions to enable customers thereof to deposit for safe keeping when the bank or institution is closed, money, papers or other items of value. More particularly, the invention relates to an improved depository construction having simplified drive and control mechanisms in which the mechanisms are readily accessible for adjustment and maintenance; and the depository construction of the invention is an improvement upon the construction shown and described in the copending Carl D. Graber application Serial No. 62,042, now Patent No. 3,059,839, granted Oct. 23, 1962.

After-hour depositories normally are installed in a wall of a bank or other building and include a depository receptacle. Authorized access by a customer to the receptacle is gained through one or more doors or closures by unlocking a simple keylock if present on the door with a key in the possession of the depositor or customer. The receptacle when the door is closed is adapted for communication with a chute leading to a safe, chest or vault within the bank or other building. Frequently a depository is provided with several doors, one closing an envelope slot through which envelopes may be deposited in the depository receptacle, and the second closing a larger opening through which bags of money or other valuables may be introduced into the depository receptacle when the latter door is opened.

Maximum convenience to the customer or depositor, and maximum security for the articles deposited may be conjointly achieved in a construction in which either or both of two doors may be readily opened by the customer without the necessity of following any special manipulations or procedures, excepting the unlocking of a simple keylock on a door if present, by simply swinging the door to a position exposing the slot or opening communicating with the depository receptacle when the latter is in normal position; in which the depository construction is driven by power means preferably electrical; in which each door after being opened and subsequently closed is locked in closed position, independently of any simple keylock if present, until the article deposited in the depository receptacle has been discharged from the receptacle into the chute and the receptacle returned to normal position by operation of the power drive means, after which the door is released for a subsequent deposit operation; in which the closing of the door which has been opened initiates both the power operation of the device and the locking of the doors during such power operation; in which barriers cut off communication between the receptacle and chute when the depository receptacle is in normal position ready for the deposit of articles into the receptacle upon opening a door, and also during the time interval when the door is open; in which all doors are maintained locked against opening, independently of any keylock if present, during the time interval when the depository receptacle is being moved between normal position and a position for discharging the contents thereof into the chute; in which the door or doors are locked and maintained locked if a power failure for the power means occurs, throughout the duration of the power failure; and in which various safety controls, operation indicating devices and protective devices may be provided when desired. Such construction prevents or deters unauthorized access to the depository receptacle or articles deposited in the receptacle or the chute leading therefrom.

The depository construction disclosed in said application Serial No. 62,042 incorporates the indicated arrangements, devices and controls. However, the drive and control mechanisms thereof, though electric motor driven, are essentially mechanical devices which have a complicated and intricate design, construction and assembly of the component parts, and require delicate adjustments when assembled and close tolerances in manufacture in order to achieve and maintain proper operation. As a result adjustment and maintenance are of critical importance. However, the mechanical devices by the very nature of the mechanisms involved are not readily accessible for maintenance or for the critical adjustments which may be required. Thus a problem has arisen for which the improvements of the invention have provided a solution.

Accordingly, it is a general object of the invention to provide an improved after-hour depository construction incorporating the fundamental arrangements and controls stated in which the drive and control mechanisms are of elementary and simple design and construction and are readily accessible for adjustment and maintenance.

A further object of the invention is to provide an improved after-hour depository construction incorporating the fundamental arrangements and controls stated in which mechanical control devices of complicated design and delicate adjustment are eliminated, in which mechanical control element parts requiring close tolerances in manufacture and assembly are eliminated, and in which simple standard electrical switches and simple, positively acting cams and levers replace the stated eliminated parts.

Also, it is an object of the invention to provide an improved after-hour depository construction with control mechanism placed in coordination with the depository elements controlled thereby at a location readily accessible for authorized access, adjustment, maintenance and replacement and arranged with ample room for making required adjustments and replacements.

Furthermore, it is an object of the invention to provide an improved after-hour depository achieving maximum security for deposited articles along with maximum customer convenience in use.

Finally, it is an object of the invention to provide a new after-hour depository construction eliminating difficulties heretofore encountered in the art; satisfying security and convenience requirements in construction, assembly, operation and use; eliminating costly manufacturing, assembly and maintenance problems heretofore involved; and achieving the stated objects in a simplified and inexpensive manner.

These and other object and advantages, apparent to those skilled in the art from the following description and claims, may be obtained, the stated results achieved, and the described difficulties overcome, by the apparatus, combinations, parts, elements, subcombinations, arrangements and constructions which comprise the present invention, the nature of which is set forth in the following general statement, a preferred embodiment of which—illustrative of the best mode in which applicants have contemplated applying the principles—is set forth in the following description and shown in the drawings, and which are particularly and distinctly pointed out and set forth in the appended claims forming part hereof.

The nature of the improved after-hour depository construction of the present invention may be stated in general terms as including in after-hour depository construction of a type having housing means provided with deposit and discharge openings, rotor receptacle means rotatable in one direction in the housing through a 360° cycle from a normal position opposite the deposit opening past the discharge opening and back to normal position, power drive means for rotating said receptacle means through said cycle, and door means for the deposit opening movable to open and closed positions; the combination of control mechanism for said power drive means and door means disposed above said housing means and actuable by movements of the door means including electrically actuated latch means engageable with the door means normally energized and unlocked when the rotor means is in normal position, and power circuits, electric switches, and latch and releases relays for the power drive means and latch means; said control mechanism being effective in a first condition during movement of the door means from closed to open positions, to prepare the drive means power circuits for energizing when the door means is reclosed, and to deenergize and release the latch means to door locking condition; in a second condition upon movement of the door means from open to closed positions, to energize the drive means power circuits for driving the rotor means through said 360° cycle of movement, and to engage the door latch means for locking the door closed when it reaches closed position and during substantially the entire 360° cycle of rotor movement; in a third condition as the rotor approaches the end of the 360° cycle of movement, to energize and unlatch the latch means; and in a fourth condition to de-energize the drive means power circuits for stopping the rotor means at normal position; said control mechanism also including cam and lever means disposed on and adjacent the rotor means and operative upon rotation of the rotor means to establish successively said third and fourth conditions of the control mechanism during the 360° cycle of rotor movement.

By way of example, an embodiment of the improved after-hour depository construction is shown in the accompanying drawings forming part hereof in which.

Similar numerals refer to similar parts throughout the drawings.

Figures 1, 6:
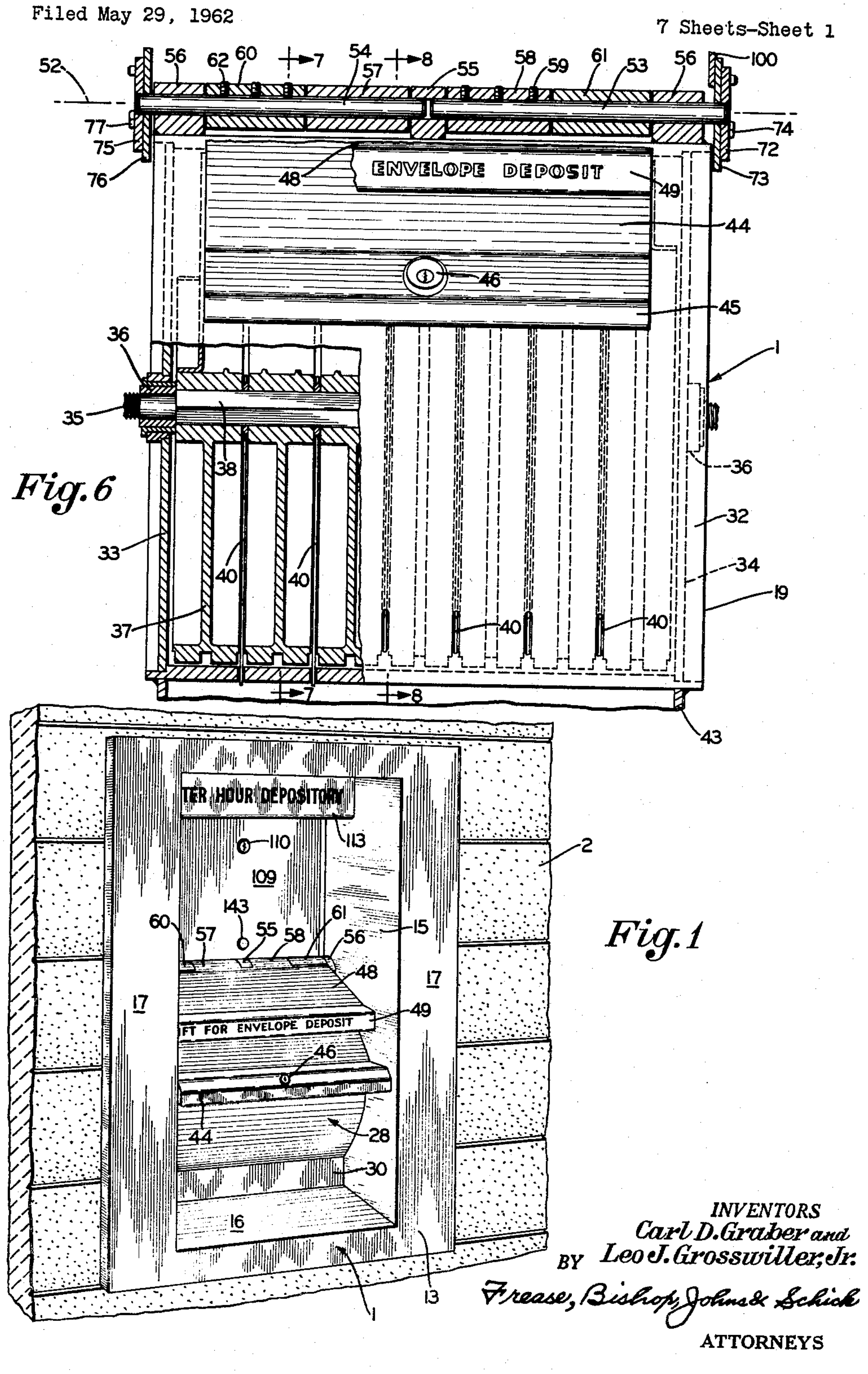
FIGURE 1 is a perspective view of the improved after-hour depository construction installed in a building wall.
FIG. 6 is a front elevational view of the housing and doors of the improved construction, with parts broken away and in section looking in the direction of the arrows 6—6, FIG. 7, the hinge mounting of the doors also being broken away and in section.

The improved after-hour depository is indicated generally at 1. It may be installed in a wall 2 of a bank or other building. In installation, a protective housing 3 is permanently mounted in the wall opening 4. The protective housing 3 preferably has a top wall 5, side walls 6, a bottom wall 7, a back wall 8 and a snout wall 9. The top wall 5, bottom wall 7, snout wall 9 and side walls 6 extend through the opening 4 and are permanenty joined to the wall 2 in a usual manner.

The lower edges of the side walls 6, back wall 8 and snout wall 9 inside of the building wall 2 form a rectangular opening 10 within which the upper end of a chute 11 may be joined as by welded joint 12. The chute 11 leads to a vault, chest or other safe-receptacle (not shown) within the bank or building.

Figure 3:
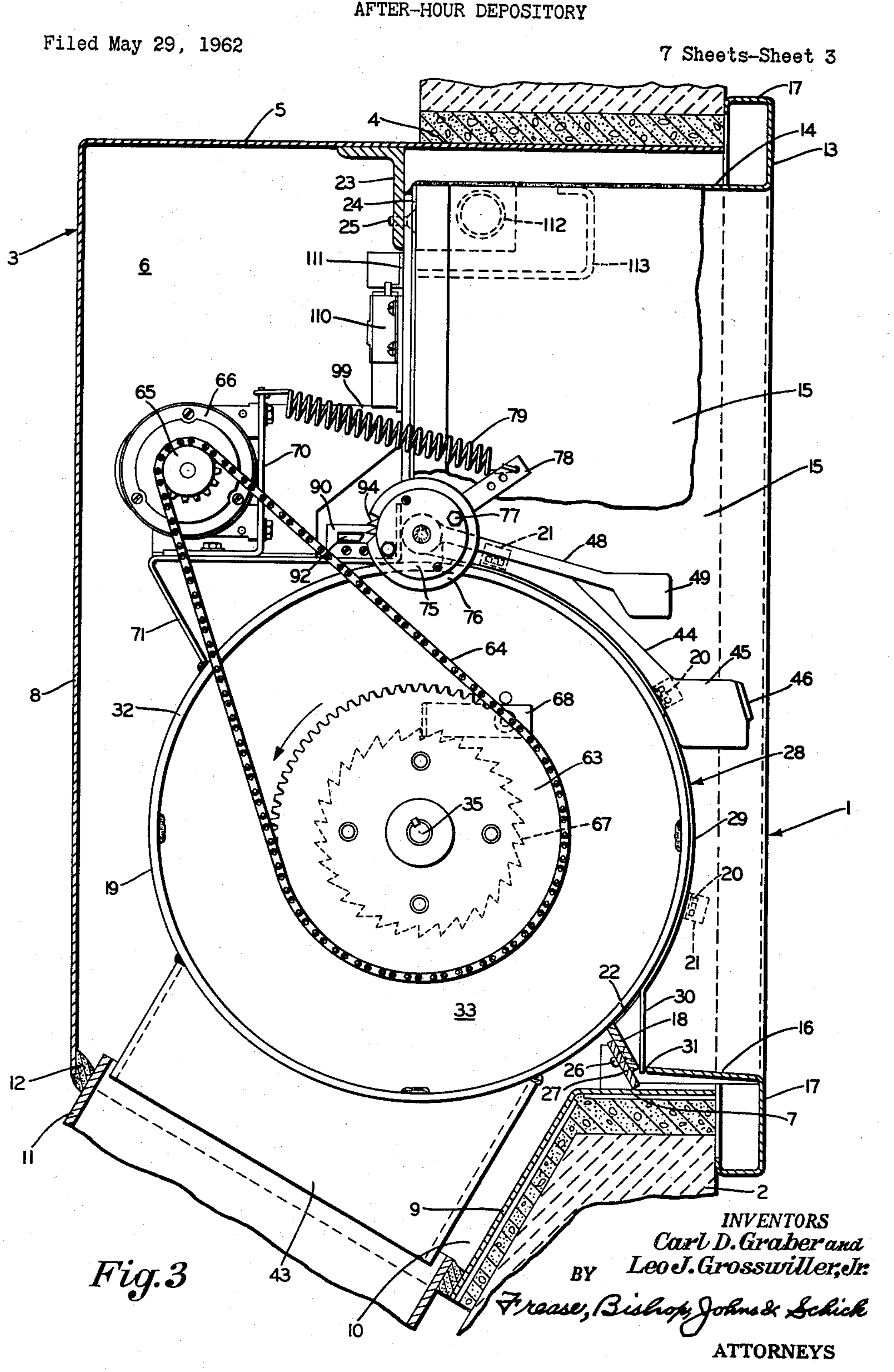
FIG. 3 is an end view of the improved construction with certain parts in section, looking in the direction of the arrows 3—3, FIG. 2.
Figure 4:
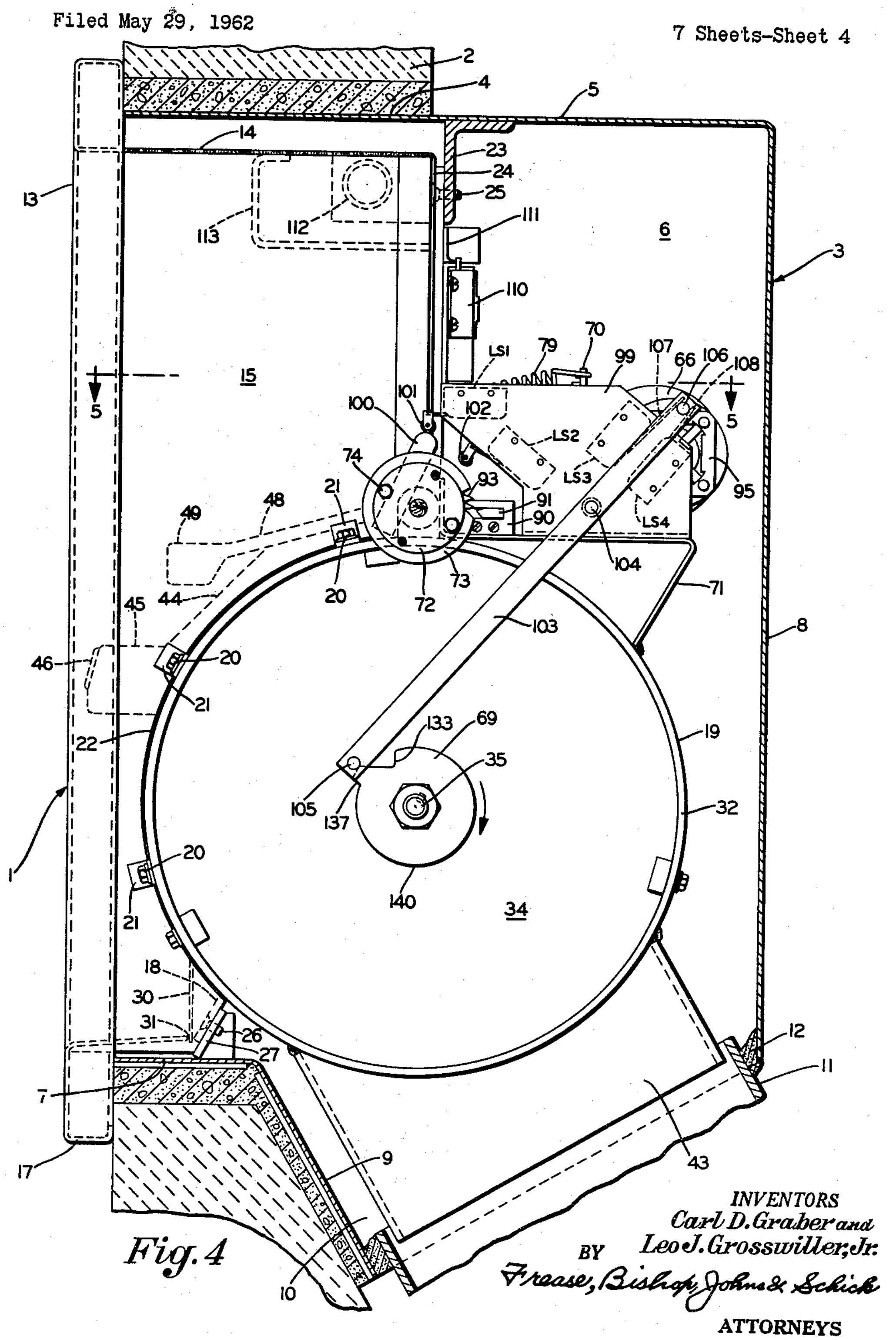
FIG. 4 is an end view of the other end of the improved construction similar to FIG. 3; looking in the direction of the arrows 4—4, FIG. 2.

A generally rectangular trim and closure frame 13 is mounted at the outer end of the wall opening 4; and the frame 13 has a top wall 14, side walls 15 and a bottom wall 16 extending inward from the trim flange walls 17 within the wall opening 4 and within the top, bottom and side walls of the protective housing 3 (FIGS. 3 and 4). A reinforcing bar 18 extends across the lower end of the frame 13 between its side walls 15 and adjacent the inner edge of the bottom wall 16. The connection of the frame 13 with the remaining parts of the device are described below.

The main depository mecahnism housing 19 is mounted on or hung from frame 13 by bolts 20 engaged with angle brackets 21 (FIGS. 3, 4 and 5) mounted on the outer face of each of the side walls 15 of the frame 13 adjacent an arcuate cut-out portion 22 in the frame side walls shaped to fit the adjacent contour of the housing 19. The frame 13 and housing 19 are assembled together in this manner and the assembly is inserted within the protective housing 3 to the position shown in FIGS. 3 and 4. The assembly is supported in installed position by an angle cross member 23 secured to the top wall of protective housing 3. A down-turned flange 24 at the rear of top wall 14 of frame 13 is bolted at 25 to member 23. The assembly is also held in supported position by bolts 26 extending through the reinforcing bar 18 on the frame 13 and a similar suport bar 27 mounted on the upper side of bottom wall 7 of protective housing 3 (FIGS. 3 and 4).

After installation a trim plate 28 having an arcuate portion 29 and a flange portion 30 is snapped into position (FIGS. 1, 2 and 3) with the bottom edge of its flange portion 30 received in the clearance space 31 (FIG. 3) between the rear edge of bottom wall 16 of frame 13 and the lower edge of reinforcing bar 18, so that the flange portion 30 covers the heads of bolts 26.

Figure 7:
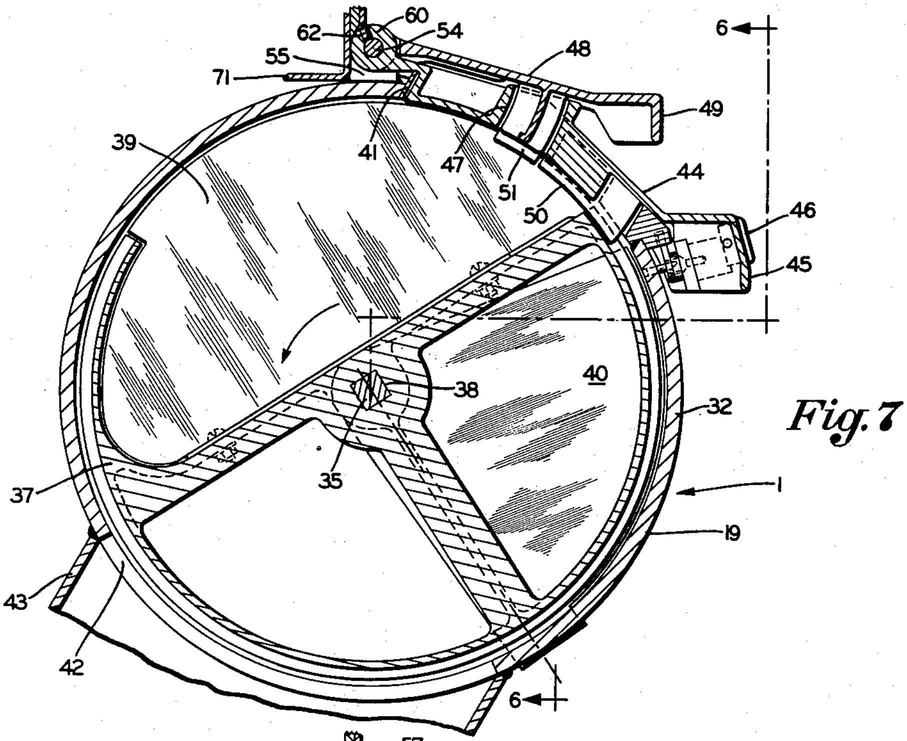
FIG. 7 is a transverse sectional view taken on the line 7—7, FIG. 6.
Figure 8:
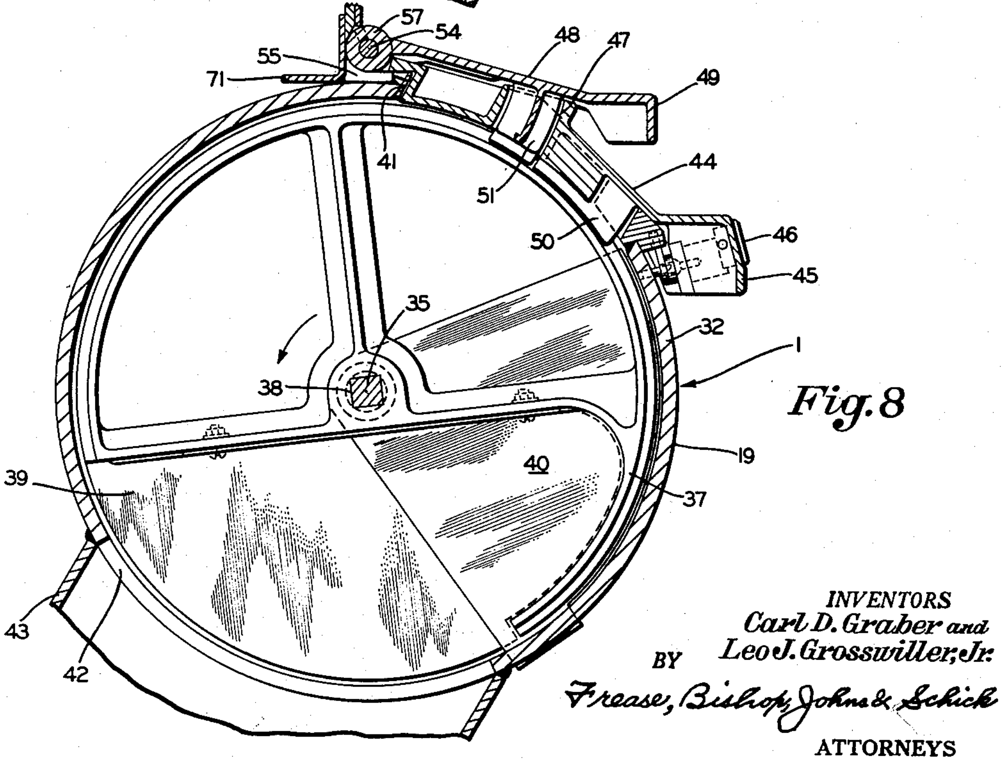
FIG. 8 is a view similar to FIG. 7 showing the rotor in a different position and taken on the line 8—8, FIG. 6.

The main depository housing 19 and the rotor mechanism therein is constructed similar to that shown in said application Serial No. 62,042. Referring particularly to FIGS. 6, 7 and 8, the housing 19 includes a cylindrical wall 32 and end walls 33 and 34. A rotor shaft 35 is journaled in bearings 36 in the housing end walls 33 and 34. A series of sector plates 37 are mounted at spaced intervals along the squared portion 38 of shaft 35. The sector plates 37 form a deposit receiving receptacle 39 within the upper portion of the housing 19 when the parts are in normal or at-rest position shown in FIG. 7.

A series of sector shaped shear plates 40 are mounted on and within housing 19 at spaced intervals between the sector plates 37.

Housing 19 is formed with a main or bag receiving opening 41 which communicates with the receptacle 39 when the rotor is in normal position as shown in FIG. 7; and the housing 19 is also provided with a discharge opening 42 which communicates with the receptacle 39 during rotation of the rotor as shown in FIG. 8. Discharge opening 42 is preferably formed with a chute extension 43 opening into the upper end of the main chute 11 (FIGS. 3 and 4).

Main bag opening 41 is closed by a main or bag opening door 44 having an operating handle formation 45 along its lower edge. The door 44, if desired, may be provided with a keylock 46 engageable with the housing 19 and adapted to be unlocked by a key in the possession of an authorized person or depositor.

Main door 44 is provided with an auxiliary letter or envelope receiving opening 47 which is closed by letter door 48 also having a handle portion 49. The main and auxiliary doors 44 and 48 each may be provided with pusher fin formations 50 and 51 as disclosed in Serial No. 62,042 for pushing any deposited article clear of the opening 41 or 47 upon closing the doors 44 or 48, respectively.

The main door 44 and letter door 48 are hinged on a common hinge axis indicated by dot-dash line 52 in FIG. 6, the hinge pin means being split and comprising pins 53 and 54. The hinge pins 53 and 54 are journaled at their adjacent ends by a central bearing 55 mounted on the housing 19; and the outer ends of each hinge pin 53 and 54 are journaled in end bearings 56 also mounted on the housing 19.

The letter door 48 has spaced hinge bosses 57 and 58 located adjacent the central bearing 55, the hinge boss 57 being rotatably journaled on hinge pin 54 and the boss 58 being fixed to hinge pin 53 by set screws 59.

Similarly, the main door 44 has spaced hinge bosses 60 and 61 connected with the hinge pins intermediate the end bearings 56 and the letter door hinge bosses 57 and 58. The hinge boss 60 is fixed to hinge pin 54 by set screws 62 while the hinge boss 61 is journaled on hinge pin 53.

This construction and arrangement enables the two doors 44 and 48 to be hinged on a common axis 52, provides for movement of the letter door 48 with the main door 44 when the main door is opened, enables the letter door 48 to be opened independently of movement of the main door 44, and provides for movement of the hinge pin to which either door is fixed along with such door for a purpose to be described.

A drive sprocket 63 is keyed to one end of the rotor shaft 35 (left-hand end viewing FIG. 2) and drive sprocket 63 is driven by chain 64 extending around pinion sprocket 65 on the shaft of drive motor 66. A back-stopping ratchet wheel 67 is fixed to rotor shaft 35 preferably between drive sprocket 63 and housing end wall 33. The ratchet teeth of ratchet 67 are engaged by pawl 68 to prevent backward rotation of rotor shaft 35 at any time, the normal direction of rotation being shown by the arrows on FIGS. 3 and 4.

A control cam 69 is keyed to the other end (right-hand end viewing FIG. 2) of rotor shaft 35 (FIG. 4) whose function will be described below.

Motor 66 is mounted on a motor bracket 70 (FIGS. 3 and 5) which in turn is mounted on a shelf-like bracket 71 that extends the full length of housing 19 within protective housing 3. The shelf bracket 71 serves as a mounting plate not only for the motor 66 but for substantially all of the control mechanism for the depository.

Figures 5, 15:
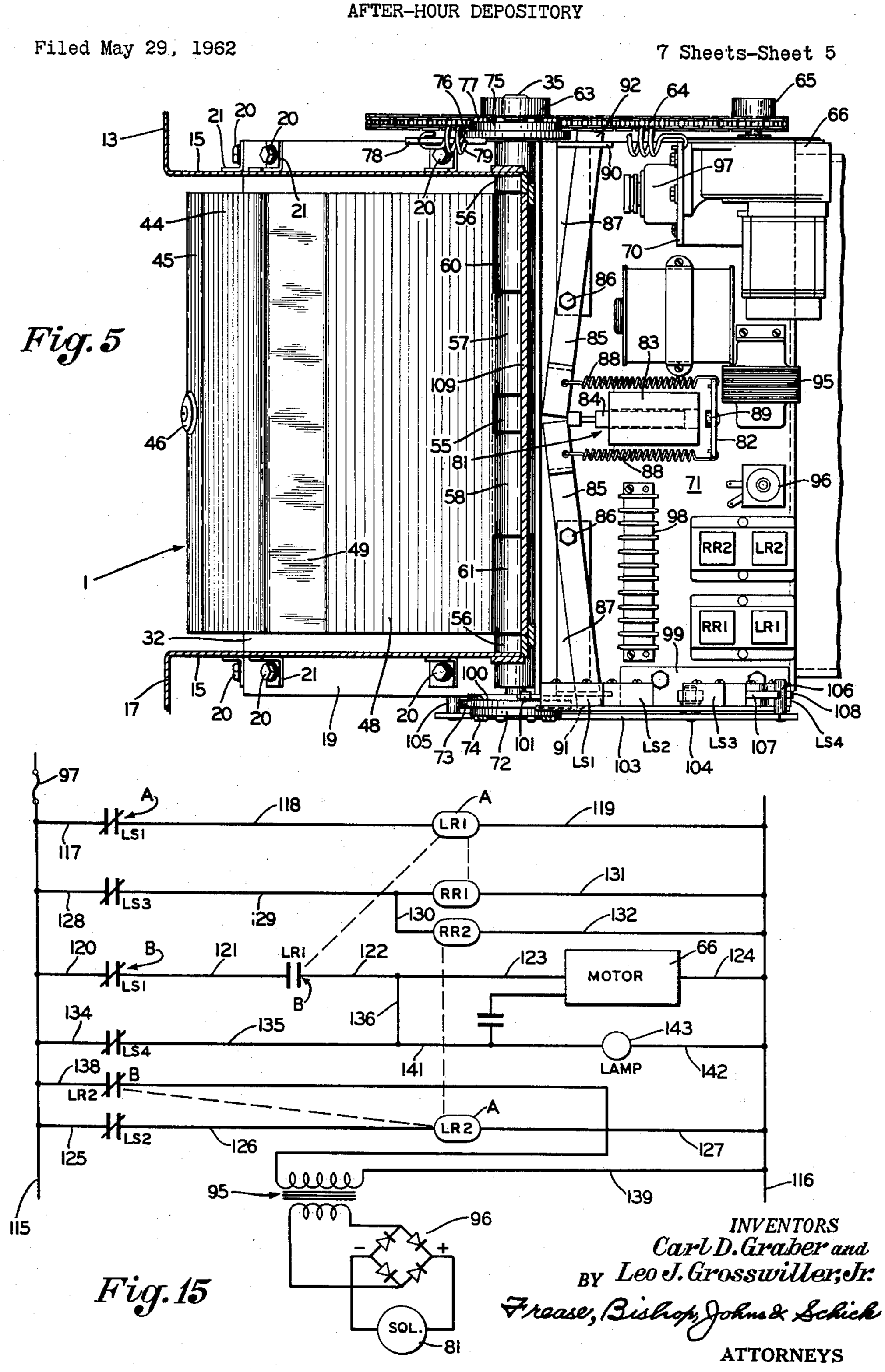
FIG. 5 is plan sectional view of the improved construction looking in the direction of the arrows 5—5, FIG. 4.
FIG. 15 is a wiring diagram of the electrical components of the control mechanism for the improved depository.

Referring particularly to FIGS. 3, 4 and 5, the hinge pin 53 to which the letter door hinge boss 58 is fixed has a letter door control disc 72 fixed to its outer end, and a ratchet disc 73 is adjustably mounted by studs 74 on the control disc 72. Similarly, a main door control disc 75 is fixed to the outer end of the hinge pin 54 to which the main door 44 is fixed, and a ratchet disc 76 is adjustably mounted on disc 75 by studs 77.

A lever arm 78 projects outwardly from ratchet disc 76 and a spring 79 is tensioned between lever arm 78 and motor bracket 70. The spring tension may be adjusted by selectively connecting one end of the spring 79 with one of the series of holes 80 in lever arm 78.

Since the main door 44 is fixed to letter door hinge pin 54 upon which spring 79 reacts, the spring 79 serves to counterbalance the weight of the doors and thus provide for effortless movement thereof by the depositor or user.

A solenoid generally indicated at 81 (FIGS. 5, 15) is mounted on top of the bracket 71. Solenoid 81 includes an L-shaped bracket 82 mounted on bracket 71 and a solenoid coil 83 mounted on bracket 82. The solenoid armature 84 is shown in FIG. 5 in energized position engaged with the adjacent ends of a pair of door locking bars 85. Each bar 85 is pivotally mounted at 86 intermediate its ends on brackets 87 carried by the shelf 71.

Tension springs 88 are connected at one end to the adjacent ends of locking bars 85 and at their other ends to the solenoid bracket 82. Springs 88 pull the ends of bars 85 toward the right (viewing FIG. 5) so as to move solenoid armature 84 to the right in abutment against solenoid stop 89 when the solenoid 81 is de-energized. Upon energizing the solenoid, armature 84 moves to the left to the position shown in FIG. 5 overcoming the tension of springs 88.

Figure 12:
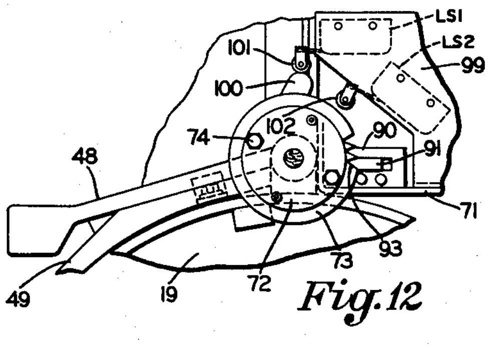

Each locking bar bracket 87 has an upstanding, U-shaped keeper flange 90 adjacent an end of shelf bracket 71 (FIGS. 3 and 4); and the outer ends 91 and 92 of the locking bars 85 extend through the slots of the U-shaped keeper flanges 90 to provide door latches for engagement with the teeth 93 and 94 of the ratchet discs 73 and 76, respectively. When the solenoid 81 is energized as shown in FIG. 5, the latch ends 91 and 92 of locking bars 85 are free of the ratchet disc teeth 93 and 94 as shown in FIGS. 3 and 4, thus permitting either of doors 44 and 48 to be opened. When the solenoid is de-energized, springs 88 move the locking bars to such position that the latch ends 91 and 92 of the locking bars 85 can engage with one of the ratchet disc teeth 93 and 94 as shown in FIG. 12 where the latch end 91 is engaged with a tooth 93 of ratchet disc 73.

A transformer 95 may be mounted on the bracket 71, and the secondary of the transformer supplies power through rectifier 96 also mounted on bracket 71 to solenoid 81. The primary of transformer 95 is connected with the power line which supplies power to the motor 66, and the power supply may be protected by fuse means 97 also mounted on shelf bracket 71.

Latch relays LR1 and LR2 and release relays RR1 and RR2 are also mounted on shelf bracket 71 as well as a terminal strip 98 through which various electrical connections shown in wiring diagram (FIG. 15) may be made.

An upstanding switch bracket 99 (FIGS. 4, 5) is mounted on the right-hand end of shelf bracket 71 (viewing FIG. 2), and control switches LS1, LS2, LS3 and LS4, are mounted on the inside face of switch bracket 99 (FIG. 5).

A switch operating cam 100 is mounted on the letter door ratchet 73 adapted to selectively engage the switch actuator rollers 101 and 102, respectively, of switches LS1 and LS2.

A switch operating lever 103 is pivotally mounted intermediate its ends at 104 on the switch bracket 99. Cam follower pin 105 on the lower end of lever 103 engages the cam surface of control cam 69. Actuator pin 106 projects from the upper end of lever 103 and is adapted to actuate the switch actuator fingers 107 and 108, respectively, of switches LS3 and LS4.

Referring particularly to FIGS. 2, 3, 4 and 5, with the exception of the drive sprocket 63, the back stop ratchet 67 and control cam 69 which are mounted on the ends of the rotor shaft 35, all of the drive and control mechanisms for the improved after-hour depository construction are mounted on the top of bracket 71 above the housing 19 where adjustments, repairs, maintenance and replacements can be taken care of readily.

Figure 2:
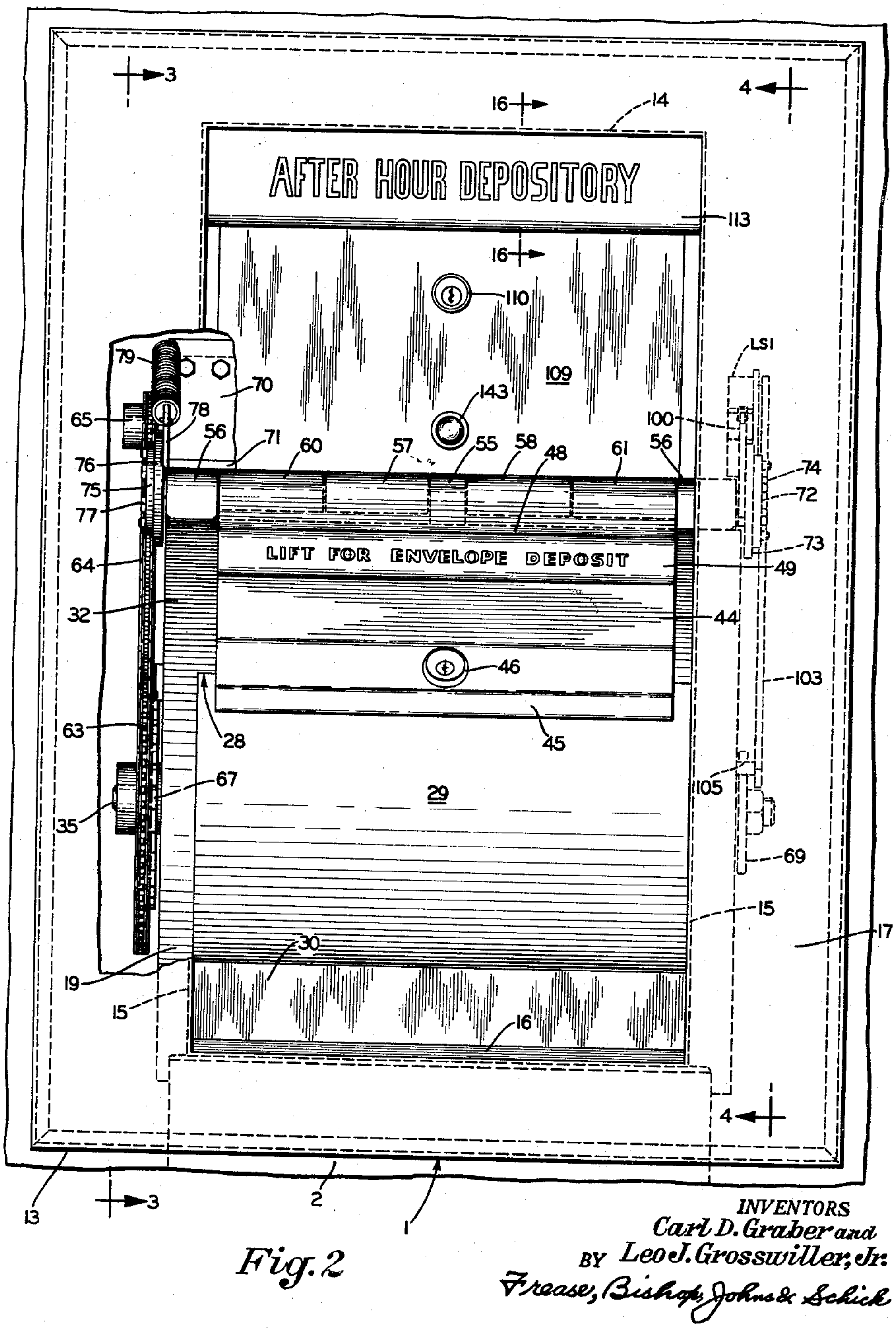
FIG. 2 is a front elevational view, with parts broken away, showing the improved construction.
Figure 16:
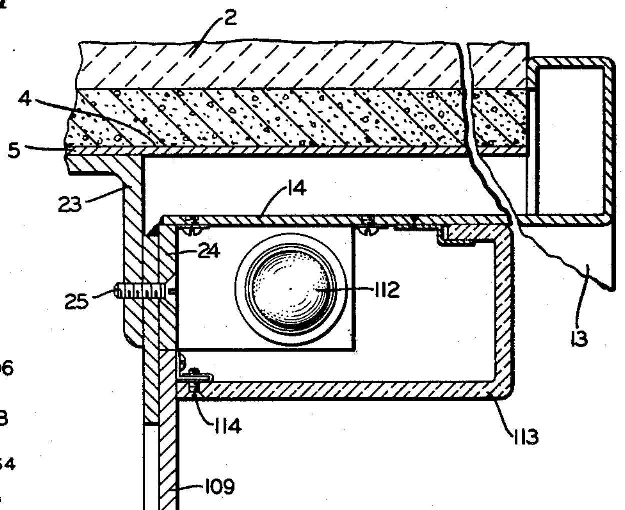
FIG. 16 is a section on line 16—16, FIG. 2.

The components mounted on bracket 71 are readily accessible by removal of the maintenance door 109 located above the hinge mounting of doors 44 and 48 (FIGS. 1–5 and 16). Door 109 may be engaged and located in place by keylock 110, the bolt of which engages in a suitable manner with a member 111 carried by downturned flange 24 of trim and closure frame 13 (FIG. 16). If desired, a light bulb 112 may be mounted on the top wall 14 of the trim and closure frame 13 (FIG. 16) and covered by a Plexiglas shade 113 carried at 114 by the upper end of maintenance door 109. The bulb 112, when lighted, may be used to display an "After-Hour Depository" sign as illustrated in FIGS. 1 and 2. Obviously, keys for the keylock 110 are held by authorized maintenance and repair personnel.

*Drive and Control Mechanism*

The drive and control mechanism for the improved after-hour depository includes the motor 66 and chain drive to the rotor shaft 35 along with the back-stop mechanism 67—68 so that the rotor shaft 35 can only be turned in one direction as shown by the arrows in FIGS. 3, 7 and 8. The control mechanism includes the split hinge pin mounting of the two doors 44 and 48, the ratchet control discs 73 and 76, the door locking bars 85 and solenoid control means 81 therefor, the switch operating cam 100, the switch operating lever 103, the control cam 69, the switches LS1, LS2, LS3 and LS4, and the relays LR1, LR2, RR1 and RR2.

*Switch LS1.*—This switch is a single pole double throw switch controlling the drive motor. It is operated by cam 100 on the letter door hinge pin 53. Referring to the wiring diagram of FIG. 15, the power supply lines are indicated at 115 and 116. One throw A of LS1 is connected through wires 117, 118 and 119 between power supply 115—16 with the coil A of latch relay LR1. Throw A of LS1 is normally held open when the letter door 48 is closed as shown in FIG. 4 where cam 100 engages actuator roller 101 of LS1. The other throw B of LS1 through wires 120, 121, 122, 123 and 124 is in circuit with line wires 115—116, motor 66, and contacts B of LR1. Throw B of LS1 is held closed when the letter door 48 is closed, that is, when actuator roller 101 is held by cam 100 in the position shown in FIG. 4.

*Switch LS2.*—This switch controls operation of solenoid 81 and is normally open when the letter door 48 is closed. When cam 100 moves past actuator roller 102 (FIG. 10) during movement of the letter door 48 from closed to open position, LS2 is closed. LS2 is connected through wires 125, 126 and 127 with line wires 115—116 and the coil A of latch relay LR2, energizing coil A of LR2 when LS2 is closed.

Figures 13, 14:
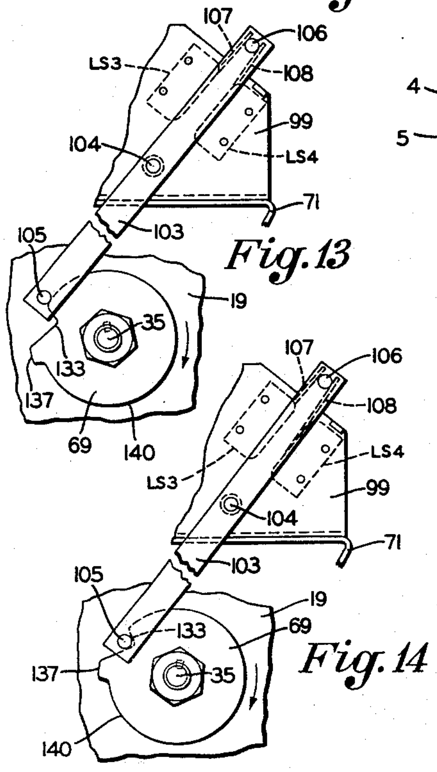
FIGS. 13 and 14 are fragmentary views similar to portions of FIG. 4 illustrating the cam and lever control portions of the control mechanism in various positions during rotation of the rotor.

*Switch LS3.*—This switch is a normally open switch controlling the operation of the release relays PR1 and RR2. LS3 is connected through wires 128, 129, 130, 131 and 132 with line wires 115—116 and with release relays RR1 and RR2. When pin 105 on switch operating lever 103 drops into cam recess 133 (FIG. 14) of control cam 69, actuator pin 106 on lever 103 closes switch LS3, thus energizing release relays PR1 and RR2.

*Switch LS4.*—This switch is normally closed and is in the motor circuit through lines 134, 135, 136, 123 and 124 with power supply 115—116. The switch is closed when the motor is running but is opened by high point 137 on cam 69 engaging pin 105 on lever 103 at completion of a 360° rotor shaft rotation cycle when the parts are in the position shown in FIG. 4. Pin 105 rides on cam high point 137 moving lever 103 to the position shown in FIG. 4 so that actuator pin 106 engaging finger 108 opens switch LS4, thus stopping motor. Switch LS4 is thus held open at this point when the motor is stopped.

*Latch relay LR1.*—This relay controls the motor circuit. Coil A of LR1 is energized when throw A of LS1 is closed. Energizing LR1 closes the LR1 contacts B in the motor circuit 120–124. This establishes a circuit for operating motor 66 as soon as the other throw B of LS1, which is open at this time, is subsequently closed. Contacts B of LR1 are held closed until later released by release relay RR1.

*Latch relay LR2.*—This relay is in circuit with solenoid 81. Its contacts B are normally closed, maintaining the solenoid energized through wires 138 and 139, the solenoid holding levers 85 in the position shown in FIG. 5 and permitting the doors to be opened. When LS2 is closed, coil A of LR2 is energized, opening LR2 contacts B and de-energizing solenoid so that levers 85 move to engage the teeth 93 and 94 on ratchet discs 73 and 76, and thus locking doors 44 and 48.

*Release relay RR1.*—This relay is in circuit with LS3 and is energized when LS3 is closed. When RR1 is energized, it releases LR1, thus opening LR1 contacts B in the motor circuit 120–124.

*Release relay RR2.*—This relay is also in circuit with LS3 and is energized when LS3 is closed. When RR2 is energized, it releases LR2 permitting LR2 contacts B to close and energize the solenoid 81.

*Solenoid 81.*—The solenoid 81 is in circuit with the LR2 contacts B. The solenoid is normally energized by the normally closed LR2 contacts, thus holding the door latch levers 85 out of latching engagement with the doors 44 and 48 permitting the doors to be opened. If there is a power failure, contacts B of LR2 open, de-energizing solenoid 81 and latching the doors by latch levers 85.

*Operation*

The operation of the improved device involves a one-revolution control of the power drive, that is, one revolution of the rotor shaft 35. The doors 44 and 48 are normally in an unlocked condition so that either letter door 48, or bag door 44 carrying the letter door with it, can be opened to receive a deposit. The closing of letter door 48, either by itself if only the letter door is opened, or along with the bag door if the bag door is opened, initiates movement of the rotor through the one-revolution cycle of operation as well as the concurrent locking of both doors closed during the cycle of operation.

Assume that the device is in normal position, ready to receive a deposit. Under these conditions the parts are in the positions shown in FIG. 4, throw A of LS1 is opened, and throw B of LS1 is closed since actuator roller 101 is held in the position shown in FIG. 4 by switch operating cam 100. LS2 is open and coil A of LR2 de-energized with contacts B of LR2 normally closed, thus closing circuit to solenoid 81 which holds latch levers 85 out of latching engagement with teeth 93 and 94 on ratchet discs 73 and 76, permitting doors 44 and 48 to be opened. LS3 is open de-energizing coils of RR1 and RR2. LS4 is held open by switch operating lever 103 whose pin 105 rides on high point 137 of cam 69. The motor circuits are thus open since LS4 is open and contacts B of LR1 are open.

Figure 9:
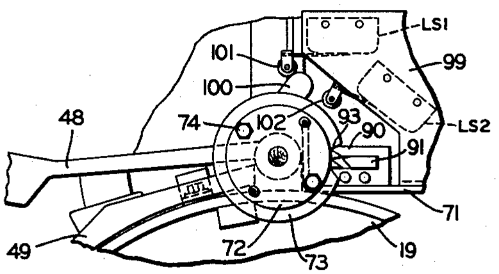
FIGS. 9, 10, 11 and 12 are fragmentary views similar to a portion of FIG. 4 illustrating one of the doors of the depository in various positions occupied during the opening and closing movements of such door for making a deposit.

Referring to FIG. 9, as the depositor starts to open letter door 48 a few degrees either by itself as shown, or along with the bag door 44, cam 100 moves off of actuator roller 101 and throw A of LS1 closes while throw B of LS1 opens. Upon closing throw A of LS1, coil A of LR1 is energized, thus closing contacts B of LR1 in one of the motor circuits. Since throw B of LS1 has opened, the closing of contacts B of LR1 does not energize the motor because LS4 is also sitll open.

Figure 10:
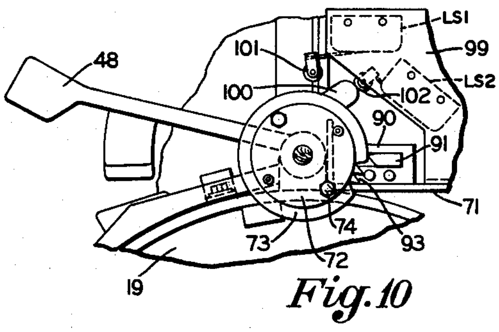

Referring to FIG. 10, as the letter door 48 continues to open further, cam 100 passes over actuator roller 102 closing LS2 momentarily. This energizes coil A of LR2 opening contacts B of LR2 de-energizing solenoid which releases the latch levers 85 so that the ends 91 and 92 thereof are spring-pressed into engagement with and ride along the cylindrical surfaces of ratchet discs 73 and 76. As door 48 continues to open cam 100 releases LS2 which opens, de-energizing LR2 coil A. However, LR2 contacts B remain open being held by RR2 which does not release LR2 contacts B to close until RR2 has been energized.

Figure 11:
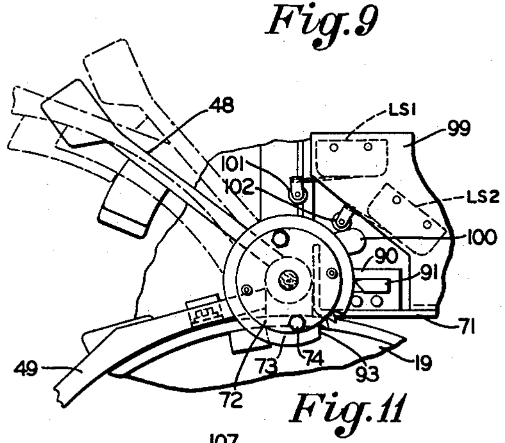

The door 48 may continue to open to the full line position shown in FIG. 11 when a letter deposit may be made in the letter opening 47. The limit of opening movement of both doors 44 and 48 is shown by dot-dash lines in FIG. 11.

After the doors have been opened and a deposit made, door 48 is moved toward closed position. During closing movement, cam 100 strikes actuator roller 102 which momentarily closes and then opens LS2, but nothing happens because LR2 contacts B are still held open by RR2. As door 48 approaches fully closed position, shown in FIG. 12, latch lever ends 91 and 92 ratchet over teeth 93 and 94. This prevents the door from being reopened and the latch lever engagement with any of the teeth latches the door in a nearly closed position, or in the completely closed position shown in FIG. 12.

As the door 48 reaches fully closed position, cam 100 engages actuator roller 101 operating LS1 to open throw A and close throw B. When throw A of LS1 opens, coil A of LR1 is de-energized; but contacts B of LR1 remain closed, being held by RR1. Meanwhile, the closing of throw B of LS1 completes circuit 120, 121, 122, 123 and 124 to the motor and the motor starts revolving rotor shaft 35 in the direction of the arrows shown in FIGS. 3, 4, 13 and 14. As shaft 35 starts to rotate, cam follower pin 105 rides off of cam high point 137 onto cylindrical dwell 140 of cam 69. At this time lever 103 moves to its central or medial position shown in FIG. 13. In this position actuator pin 106 releases switch actuator finger 108, permitting LS4 which has been held open, to close, thus closing a second power supply 134, 135 and 136 to the motor circuit.

The motor continues operation rotating shaft 35 through the cycle of operation. As the rotor shaft 35 approaches the end of its 360° cycle, say at about 350°, cam follower pin 105 drops into cam groove 133 and actuator pin 106 on switch operating lever 103 moves actuator finger 107 to close switch LS3. When switch LS3 closes, RR1 and RR2 are energized. RR1 when energized releases LR1 contacts B which open. However, the motor continues to run by power supplied through the motor circuit maintained by LS4. RR2 when energized releases LR2 contacts B. permitting them to close which energizes the circuit to the solenoid. Then solenoid armature 84 moves levers 85 to release the latched engagement of their ends 91 and 92 with the teeth on the door ratchet discs 73 and 76, thus unlocking the doors.

As rotor shaft 35 completes a 360° cycle of rotation, cam follower pin 105 rides up onto high point 137 of cam 69 and switch operating lever 103 moves to the position shown in FIG. 4 so that switch actuator pin 106 releases LS3 and actuates LS4 to open the latter. Opening of LS4 opens the motor circuit, and stops the motor. Since the doors were released by the solenoid operation at 350°, the doors are now unlocked ready for another depositing operation.

The solenoid remains energized at all times when the doors are unlocked but not opened. However, a power failure de-energizes the solenoid 81 whereupon the doors are locked in closed position.

If desired, wires 141 and 142 may be connected with wires 134 and 135 paralleling the motor circuit and connected with a lamp 143 which is thus lighted when the motor is operating to give a visual indication to the depositor that the equipment is normally operating.

The split hinge pin 53—54 arrangement for the letter and bag doors 44 and 48 enables the ratchet disc 73 to be fixed with relation to the letter door 48 so that opening and closing movements of the letter door initiate operation of the drive for one cycle and concurrently lock the doors closed upon return movement of the letter door to closed position. At the same time, the letter and bag doors may be hinged on the same axis with relative hinge movements of the letter door 48 with respect to the bag door 44, and yet the bag door is fixed to hinge pin 54 so as to accomplish direct locking of the bag door 44 through ratchet disc 76 fixed to the bag door hinge pin 54.

In view of the simplicity of the various components of the drive and control mechanism for the improved after-hour depository, the accessibility thereof to adjustment, maintenance and replacement, problems heretofore existing with respect to the manufacture, installation and use of a rotary depository of the type illustrated are eliminated. At the same time, a maximum degree of security is maintained along with ease of operation of the depository in use.

Accordingly, the present invention provides an improved after-hour depository construction achieving maximum convenience in use and maximum security for articles deposited; provides a construction in which the drive and control mechanisms are of elementary and simple design and construction readily accessible for adjustment and maintenance; and provides a construction eliminating difficulties heretofore encountered, satisfying manifold requirements for achieving security along with convenience, eliminating costly manufacturing, assembly and maintenance problems, and accomplishing the many new functions described.

In the foregoing description certain terms have been used for brevity, clearness and understanding, but no unnecessary limitations are to be implied beyond the requirements of prior art because such terms are used for descriptive purposes and are intended to be broadly construed.

Moreover, the description and illustration of the invention is by way of example and the scope of the invention is not limited to the exact structure shown, because the sizes, shapes and movements of the various parts and components may be varied to provide other structural embodiments without departing from the fundamental principles of the invention.

Having now described the features, discoveries and principles of the invention, the assembly, characteristics, operation and use of a preferred form thereof, and the advantageous, new and useful results obtained thereby; the new and useful apparatus, combinations, parts, elements, subcombinations, arrangements and constructions, and mechanical equivalents obvious to those skilled in the art are set forth in the appended claims.

We claim:

1. In after-hour depository construction of a type having housing means provided with deposit and discharge openings, rotor receptacle means rotatable in one direction in the housing through a 360° cycle from a normal position opposite the deposit opening past the discharge opening and back to normal position, power drive means for rotating said receptacle means through said cycle, and door means for the deposit opening movable to open and closed positions; the combination of control mechanism for said power drive means and door means actuable by movements of the door means including electrically actuated latch means engageable with the door means normally energized and unlocked when the rotor means is in normal position, and power circuits, electric switches, and latch and release relays for the power drive means and latch means; said control mechanism being effective in a first condition during movement of the door means from closed to open positions, to prepare the drive means power circuits for energizing when the door means is reclosed, and to de-energize and release the latch means to door locking condition; in a second condition upon movement of the door means from open to closed positions, to energize the drive means power circuits for driving the rotor means through said 360° cycle of movement, and to engage the door latch means for locking the door closed when the door reaches closed position and during substantially the entire 360° cycle of rotor movement; in a third condition as the rotor approaches the end of the 360° cycle of movement, to energize and unlatch the latch means; and in a fourth condition to de-energize the drive means power circuits for stopping the rotor means at normal positon; said control mechanism also including cam and lever means actuated by and operative upon rotation of the rotor means to establish successively said third and fourth conditions of the control mechanism during the 360° cycle of rotor movement.

2. The construction defined in claim 1 in which said control mechanism electrically actuated latch means, power circuits, electric switches, and latch and release relays are disposed above the housing means, and in which the control mechanism cam and lever means are disposed on and adjacent the rotor means.

3. The construction defined in claim 2 in which a protective housing encloses the rotor housing means and control mechanism, in which the protective housing is provided with an access opening above the rotor housing means communicating with the control mechanism elements disposed above the rotor housing means and in which a removable access door is provided for said access opening.

4. The construction defined in claim 1 in which hinge means mounts the door means on the housing means for movement to open and closed positions, and in which the electrically actuated latch means includes ratchet disc means fixed to the door hinge means and movable with the door means, locking bar means pivotally mounted on the housing means engageable with the ratchet disc means for locking the door means against movement, spring means normally urging the locking bar means into locking engagement with the ratchet disc means, and solenoid means when energized operable to disengage the locking engagement of the locking bar means with the ratchet disc means.

5. The construction defined in claim 4 in which spring means is provided reacting between the housing means and ratchet disc means to counterbalance the door means during movements of the latter.

6. The construction defined in claim 1 in which hinge means mounts the door means on the housing means for movement to open and closed positions; in which the hinge means has cam means fixed thereto and movable with the door means, in which said cam means actuates certain of said electric switches to establish said first condition of said control mechanism upon movement of the door means from closed to open positions; and in which said cam means actuates certain of said electric switches to establish said second condition of said control mechanism upon movement of the door means from open to closed positions.

7. The construction defined in claim 1 in which said control mechanism cam and lever means includes a cam mounted on the rotor means, and a lever mounted on the housing engageable with the cam and certain of said electric switches; and in which the cam is provided with cam formations engaged by the lever moving the lever to three different positions during said 360° cycle of rotor movement; said lever engagement with certain of said switches being effective in a first lever position, to establish a holding circuit for the drive means power circuits; in a second position, to establish said third condition of the control mechanism; and in a third position, to establish said fourth condition of the control mechanism.

8. In after-hour depository construction of a type having housing means provided with a plurality of deposit openings and a discharge opening with one of the deposit openings being a bag opening and another an envelope opening, rotor receptacle means rotatable in one direction in the housing through a 360° cycle from a normal position opposite the deposit openings past the discharge opening and back to normal position, power drive means for rotating said receptacle means through said cycle, a door for the bag opening, a door for the envelope opening, hinge means mounting the doors on the same axis on the housing means for movement to open and closed positions, the envelope door being movable independently of the bag door, the envelope door moving with said bag door when the latter is moved; the combination of control mechanism for said power drive means and doors actuable by movements of either door including electrically actuated latch means and power circuits, electric switches, and lever and release relays for the power drive means and latch means; the latch means including a ratchet disc fixed to each door and movable therewith, a pair of locking bars pivotally mounted on the housing means, each locking bar having one end engageable with one of the ratchet discs for locking such door against movement, spring means normally urging the locking bars into locking engagement with the ratchet discs, and solenoid means when energized operable to disengage the locking engagement of the locking bars with the ratchet discs; said control mechanism being effective in a first condition during movement of either of the doors from closed to open positions, to prepare the drive means power circuits for energizing when such door is reclosed, and to de-energize and release the latch means to door locking condition; in a second condition upon movement of such door from open to closed positions, to energize the drive means power circuits for driving the rotor means through said 360° cycle of movement, and to engage the latch means for locking the doors closed when such door reaches closed position and during substantially the entire 360° cycle of rotor movement; in a third condition as the rotor approaches the end of the 360° cycle of movement, to energize and unlatch the latch means; and in a fourth condition to de-energize the drive means power circuits for stopping the rotor means at normal position; said control mechanism also including cam and lever means actuated by and operative upon rotation of the rotor means to establish successively said third and fourth conditions of the control mechanism during the 360° cycle of rotor movement.

9. The construction defined in claim 8 in which the hinge means includes a separate hinge pin for each door, each door being fixed to one hinge pin and rotatable on the other hinge pin, and the ratchet disc for each door being fixed to the hinge pin to which such door is fixed.

No references cited.